(12) United States Patent
Buesser et al.

(10) Patent No.: US 11,334,671 B2
(45) Date of Patent: May 17, 2022

(54) ADDING ADVERSARIAL ROBUSTNESS TO TRAINED MACHINE LEARNING MODELS

(71) Applicant: INTERNATIONAL BUSINESS MACHINES CORPORATION, Armonk, NY (US)

(72) Inventors: Beat Buesser, Ashtown (IE); Maria-Irina Nicolae, Dublin (IE); Ambrish Rawat, Dublin (IE); Mathieu Sinn, Dublin (IE); Ngoc Minh Tran, Dublin (IE); Martin Wistuba, Dublin (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/601,451

(22) Filed: Oct. 14, 2019

(65) Prior Publication Data
US 2021/0110045 A1   Apr. 15, 2021

(51) Int. Cl.
*G06F 21/57* (2013.01)
*G06F 11/14* (2006.01)
*G06N 20/00* (2019.01)

(52) U.S. Cl.
CPC ........ *G06F 21/577* (2013.01); *G06F 11/1471* (2013.01); *G06N 20/00* (2019.01)

(58) Field of Classification Search
CPC .... G06N 20/00; G06F 21/577; G06F 11/1471
See application file for complete search history.

(56) References Cited

U.S. PATENT DOCUMENTS

| 9,619,749 | B2 | 4/2017 | Pescianschi |
| 9,977,430 | B2 | 5/2018 | Shalev-Schwartz et al. |
| 9,998,445 | B2 | 6/2018 | Wallrabenstein |
| 10,192,146 | B2 | 1/2019 | Sen et al. |

(Continued)

FOREIGN PATENT DOCUMENTS

| CN | 108304858 A | 7/2018 |
| CN | 108322349 A | 7/2018 |

(Continued)

OTHER PUBLICATIONS

Faiq Khalid • Muhammad Abdullah Hanif • Semeen Rehman • Junaid Qadir • Muhammad Shafique; FAdeML: Understanding the Impact of Pre-Processing Noise Filtering on Adversarial Machine Learning; 2019 Design, Automation & Test in Europe Conference & Exhibition (DATE) (pp. 902-907); (Year: 2019).*

(Continued)

*Primary Examiner* — Luu T Pham
*Assistant Examiner* — Chao Wang
(74) *Attorney, Agent, or Firm* — Griffiths & Seaton PLLC

(57) ABSTRACT

One or more hardened machine learning models are secured against adversarial attacks by adding adversarial protection to one or more previously trained machine learning models. To generate the hardened machine learning models, the previously trained machine learning models are retrained and extended using preprocessing layers or using additional network layers which test model performance on benign or adversarial samples. A rollback strategy is additionally implemented to retain intermediate model states during the retraining to provide recovery if a training collapse is detected.

17 Claims, 8 Drawing Sheets

(56) References Cited

U.S. PATENT DOCUMENTS

| | | | |
|---|---|---|---|
| 2018/0005136 A1 | 1/2018 | Gai et al. | |
| 2019/0050727 A1 | 2/2019 | Anderson et al. | |
| 2019/0354688 A1* | 11/2019 | Ding | G06F 21/52 |
| 2020/0125928 A1* | 4/2020 | Doyle | G06K 9/6256 |
| 2020/0126533 A1* | 4/2020 | Doyle | G10L 15/1815 |
| 2020/0160170 A1* | 5/2020 | Kursun | G06K 9/6262 |
| 2020/0234110 A1* | 7/2020 | Singh | G06N 3/04 |

FOREIGN PATENT DOCUMENTS

| | | |
|---|---|---|
| CN | 108537271 A | 9/2018 |
| CN | 108615048 A | 10/2018 |
| WO | 2019014487 A1 | 1/2019 |
| WO | 20190144871 A1 | 1/2019 |

OTHER PUBLICATIONS

Bita Darvish Rouhani • Mohammad Samragh • Mojan Javaheripi • Tara Javidi • Farinaz Koushanfar; DeepFense: Online Accelerated Defense Against Adversarial Deep Learning; 2018 IEEE/ACM International Conference on Computer-Aided Design (ICCAD) (pp. 1-8); (Year: 2018).*

Bingcai Chen • Zhongru Ren • Chao Yu • Iftikhar Hussain • Jintao Liu; Adversarial Examples for CNN-Based Malware Detectors; IEEE Access (vol. 7, pp. 54360-54371); (Year: 2019).*

"Machine Learning to Select Best Network Access Point", IPCOM000252087D; Electronic Publication Date: Dec. 15, 2017, (35 Pages).

"Machine Learned Wireless Propagation Model", IPCOM000252102D; Electronic Publication Date: Dec. 15, 2017 (36 Pages).

"Adversarial Robustness: Theory and Practice", Kolter, Z. et al.; (49 Pages).

"Improving the Adversarial Robustness and Interpretability of Deep Neural Networks by Regularizing Their Input Gradients"; Ross, AS. et al.; (10 Pages).

"Making Machine Learning Robust Against Adversarial Inputs"; Goodfellow, I. et al. Communications on the ACM, Jul. 2018; vol. 61: No. 7; (11 Pages).

Madry et al.: "Towards Deep Learning Models Resistant to Adversarial Attacks". arXiv:1706.06083v4, [stat.ML], Sep. 4, 2019 (28 Pages).

Miyato et al.: "Adversarial Training Methods for Semi-Supervised Text Classification". arXiv:1605.07725v3, [stat.ML], May 6, 2017. (11 Pages).

Sood et al., "NeuNetS: An Automated Synthesis Engine for Neural Network Design", arXiv:1901.06261v1 [cs.LG] Jan. 17, 2019. (14 Pages).

Nicolae et al., "Adversarial Robustness Toolbox v0.4.0". arXiv:1807.01069v4 [cs.LG] Nov. 12, 2019, (34 Pages).

* cited by examiner

ADDING ADVERSARIAL ROBUSTNESS TO TRAINED MACHINE LEARNING MODELS

BACKGROUND OF THE INVENTION

Field of the Invention

The present invention relates in general to computing systems, and more particularly to, various embodiments for adding adversarial robustness to trained machine learning models against adversaries in a computing system using a computing processor.

Description of the Related Art

Computing systems may be found in the workplace, at home, or at school. Due to the recent advancement of information technology and the growing popularity of the Internet, a wide variety of computer systems have been used in machine learning. Machine learning is a form of artificial intelligence that is employed to allow computers to evolve behaviors based on empirical data. Machine learning may take advantage of training examples to capture characteristics of interest of their unknown underlying probability distribution. Training data may be seen as examples that illustrate relations between observed variables. A major focus of machine learning research is to automatically learn to recognize complex patterns and make intelligent decisions based on data.

SUMMARY OF THE INVENTION

Various embodiments for securing trained machine learning models by one or more processors in a computing system, are provided. In one embodiment, by way of example only, a method for adding adversarial robustness to trained machine learning models against adversaries in a computing system, again by a processor, is provided. One or more hardened machine learning models are secured against adversarial attacks by adding adversarial protection to one or more trained machine learning model.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
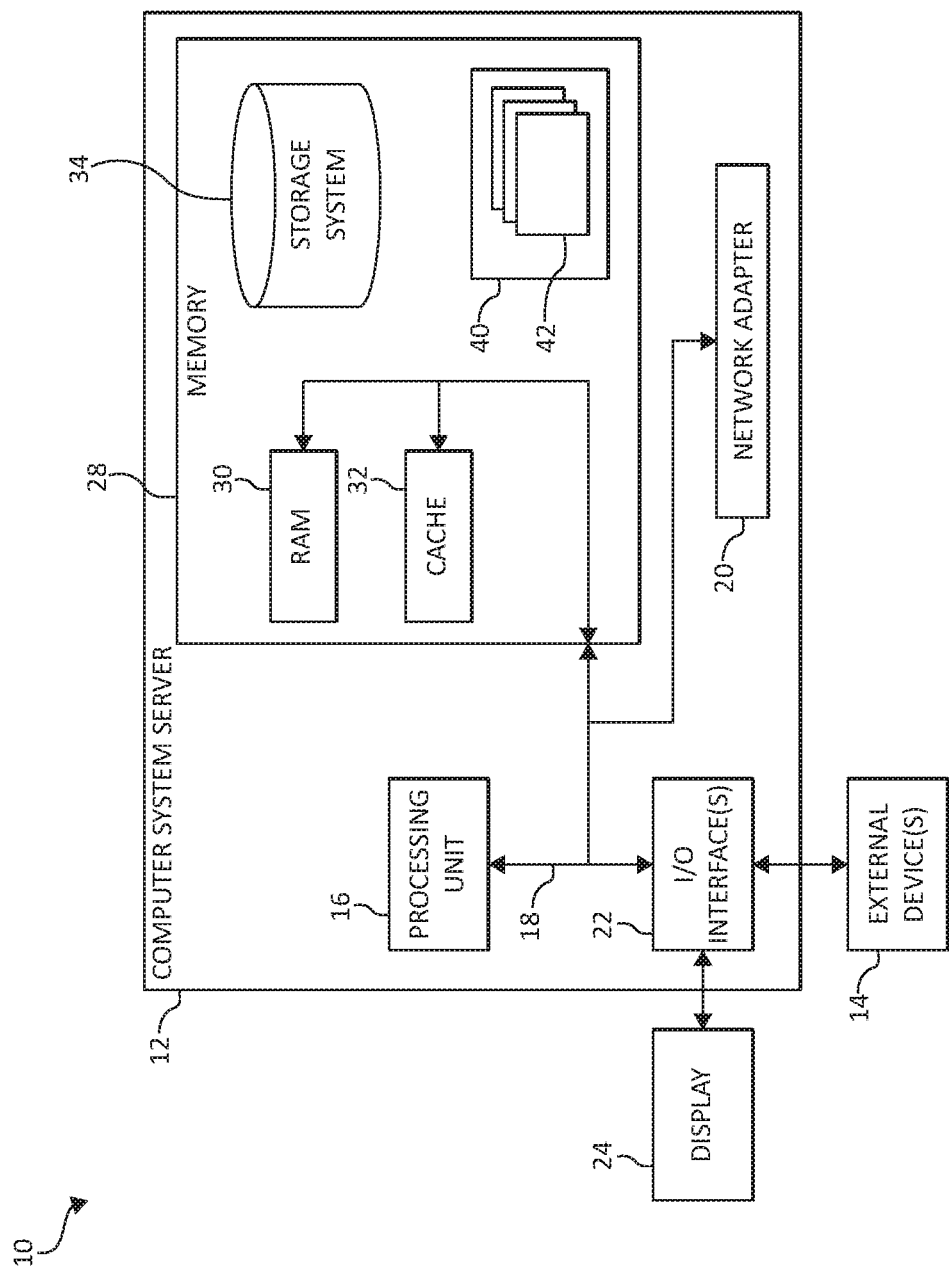
FIG. 1 is a block diagram depicting an exemplary cloud computing node according to an embodiment of the present invention.

The present invention relates generally to the field of artificial intelligence ("AI") such as, for example, machine learning and/or deep-learning. Deep-learning refers to a class of machine learning algorithms that are based on the learning of multiple levels of features or representations of a set of data. Current deep-learning methods include using a cascade of multiple layers of nonlinear processing units for feature extraction and transformation. Feature extraction refers to the process of receiving an initial set of measured data and building derived values (or features) to facilitate subsequent learning and generalization steps. In many cases, higher level features are derived from lower level features to generate a hierarchical representation of the measured data and the derived features.

Moreover, deep-learning algorithms are based on distributed representations. Distributed representations operate under the assumption that observed (or measured) data are the result of interactions of one or more factors organized into one or more layers. Conceptually, deep-learning introduces an additional assumption that the layers of factors that interact to provide the measured data are representative of levels of abstraction or composition. Under this assumption, multiple layers and layer sizes correspond to different amounts of abstraction.

Overall, deep-learning has led to major advances in optimizing decision making and extracting business value from unstructured data such as, for example, images, audio, videos and texts. However, while deep-learning achieves increased computing performance on a wide variety of data types and tasks, some challenges, weakness, and/or security issues of Deep Neural Networks (DNNs) exists. For example, DNNs are susceptible to adversarial attacks where an adversary can completely alter the behavior of the DNN by making imperceptible changes to its inputs. Moreover, adversaries/adversarial systems (e.g., which may implement an adversarial attack) may also be mounted in the physical world posing a real threat to the deployment of AI and Deep-learning specifically in security-critical applications such as, for example, biometrics, cybersecurity, autonomous vehicles, robotics, etc.

Currently, due to the fact that trained machine learning models lack adversarial robustness against adversarial samples, deploying machine learning models in mission-critical contexts (e.g., business context) is inhibited along with trust in an AI system being undermined. In one aspect, "adversarial sample" may be synonymous with adversarial examples. Adversarial samples/examples may be inputs to a machine learning model that an attacker/adversary has intentionally designed to cause the machine learning model to make a mistake or cause an error. Although "white-box scenarios" provide defenses against adversarial samples, defending against white-box attacks remains challenging. Protecting against adversarial threats requires a deep understanding of adversarial samples, attacks, and defenses and only a small number of experts possess the required knowledge and experience to apply such defenses. Therefore, protecting and securing trained machine learning/deep-learning models against adversarial samples is essential to ensuring the safe deployment of AI and DL in real-world security-critical applications and, more broadly, to sustaining trust in AI systems.

Accordingly, various embodiments are provided herein for securing trained machine learning models (e.g., neural network models and any machine learning model that can be trained with gradient based optimization algorithms). In one embodiment, by way of example only, one or more hardened machine learning models are provided secured against adversarial attacks by adding adversarial protection to one or more trained machine learning model.

In an additional aspect, by way of example only, one or more hardened machine learning models are provided secured against adversarial attacks by adding adversarial protection to one or more trained machine learning model. The retrained machine learning model may be extended with pre-processing layers to create an extended machine learning model. If the machine learning model is a neural network, the present invention may add to the machine learning model additional layers and retrains the trained machine learning model in order to prevent accuracy loss due to the pre-processing layers. "Trained learning model" as used herein may indicate a model "M" is already trained to a desired state. In one aspect, model "M" may be extended (e.g., an extended machine learning model) by adding one or more additional layers so the structure of model M changes to, indicate "M+K". Then, a new model "M+K" needs to be trained again, which is indicated herein as retraining One or more roll-back strategies may be applied to maintain/keep intermediate model states (e.g., model weights) before some or all of them (e.g., keep/save model M2, M4, and M6 instead of saving models M1, M2, M3, and/or M5 so as to save maintenance costs) and recovers from the model states if a training collapse is detected. Training a machine learning model "M" means that the state of model M may be changed through a loop. At the beginning, M is at state M1, and the next iteration is state M2 and may continue until a last iteration with Mn. It may be expected that the model becomes more accurate/better through each iteration. So model state Mn may be the most optimized/best to be used for prediction. Models M1, M2, . . . Mn−1 may be called intermediate. However, in practice, it may not be known exactly what is a needed number of iterations (i.e. "n"). For example, perhaps model M10 is ideal and most optimal and it may be desirable stop when "n" is equal to ten ("10") but that is unknown the system continues to train for M11 and so on which may be worse. Therefore, it is desirable to maintain/keep some intermediate model states just in cases they are better than the last model.

Additionally, a post-processing output layer may be added to the retrained extended machine learning model resulting in the protected machine learning model. One or more performance reports performance of the protected machine learning model on benign and adversarial samples (e.g., under black-box and/or white-box attacks) may be provided. The protected machine learning model may then be returned to the user of the system.

Accordingly, the present invention hardens previously trained machine learning models against adversarial challenges and enables deployment of secure, trained machine learning models especially in security-critical applications (e.g., healthcare, insurance, finance, etc.). In an additional aspect, machine learning models may be hardened against adversaries/adversarial systems comprised of computers, CPUs, GPUs, servers, preprocessors, learners, and neural networks. It should be noted that the hardening of machine learning models may also be provided in a cloud-based environments as a service.

In an additional aspect, by way of example only, adversarial robustness may be added to trained machine learning models by retraining the trained machine learning model. The present invention may add a postprocessing function to the trained machine learning model and/or add input pre-processing layers to a neural network and adjust the defense strength of the pre-processing layers.

The present invention may extend a trained neural network with additional neural network layers. The present invention may request input from the user or system on optionally select steps of the protection process. Additionally, the present invention may determine the machine learning model performance on benign samples and/or determine the machine learning model performance on adversarial samples. The performance of benign and/or adversarial examples may be reported/communicated back to a user or another computing system. The present invention may keep track of intermediate states of the trained machine learning model during adversarial retraining and may detect training collapse and enable roll-back strategies.

Also, it should be noted that one or more calculations may be performed using various mathematical operations or functions that may involve one or more mathematical operations (e.g., performing rates of change/calculus operations, solving differential equations or partial differential equations analytically or computationally, using addition, subtraction, division, multiplication, standard deviations, means, averages, percentages, statistical modeling using statistical distributions, by finding minimums, maximums or similar thresholds for combined variables, etc.).

In general, as used herein, "optimize" may refer to and/or defined as "maximize," "minimize," or attain one or more specific targets, objectives, goals, or intentions. Optimize may also refer to maximizing a benefit to a user (e.g., maximize a trained machine learning model benefit). Optimize may also refer to making the most effective or functional use of a situation, opportunity, or resource.

Additionally, "optimize" need not refer to a best solution or result but may refer to a solution or result that "is good enough" for a particular application, for example. In some implementations, an objective is to suggest a "best" combination of preprocessing operations ("preprocessors") and/or machine learning models, but there may be a variety of factors that may result in alternate suggestion of a combination of preprocessing operations ("preprocessors") and/or machine learning models yielding better results. Herein, the term "optimize" may refer to such results based on minima (or maxima, depending on what parameters are considered in the optimization problem). In an additional aspect, the terms "optimize" and/or "optimizing" may refer to an operation performed in order to achieve an improved result such as reduced execution costs or increased resource utilization, whether or not the optimum result is actually achieved. Similarly, the term "optimize" may refer to a component for performing such an improvement operation, and the term "optimized" may be used to describe the result of such an improvement operation.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random-access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
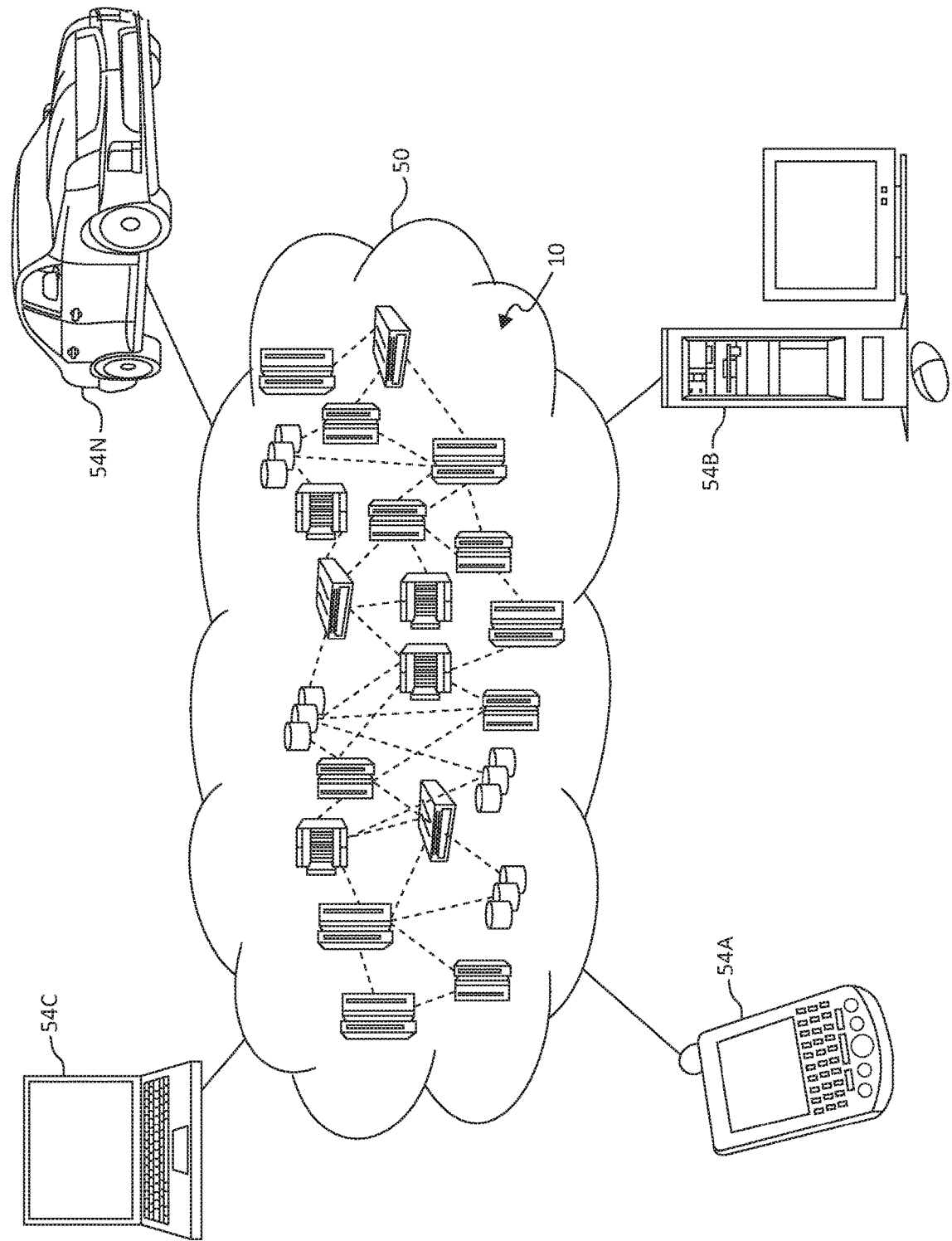
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
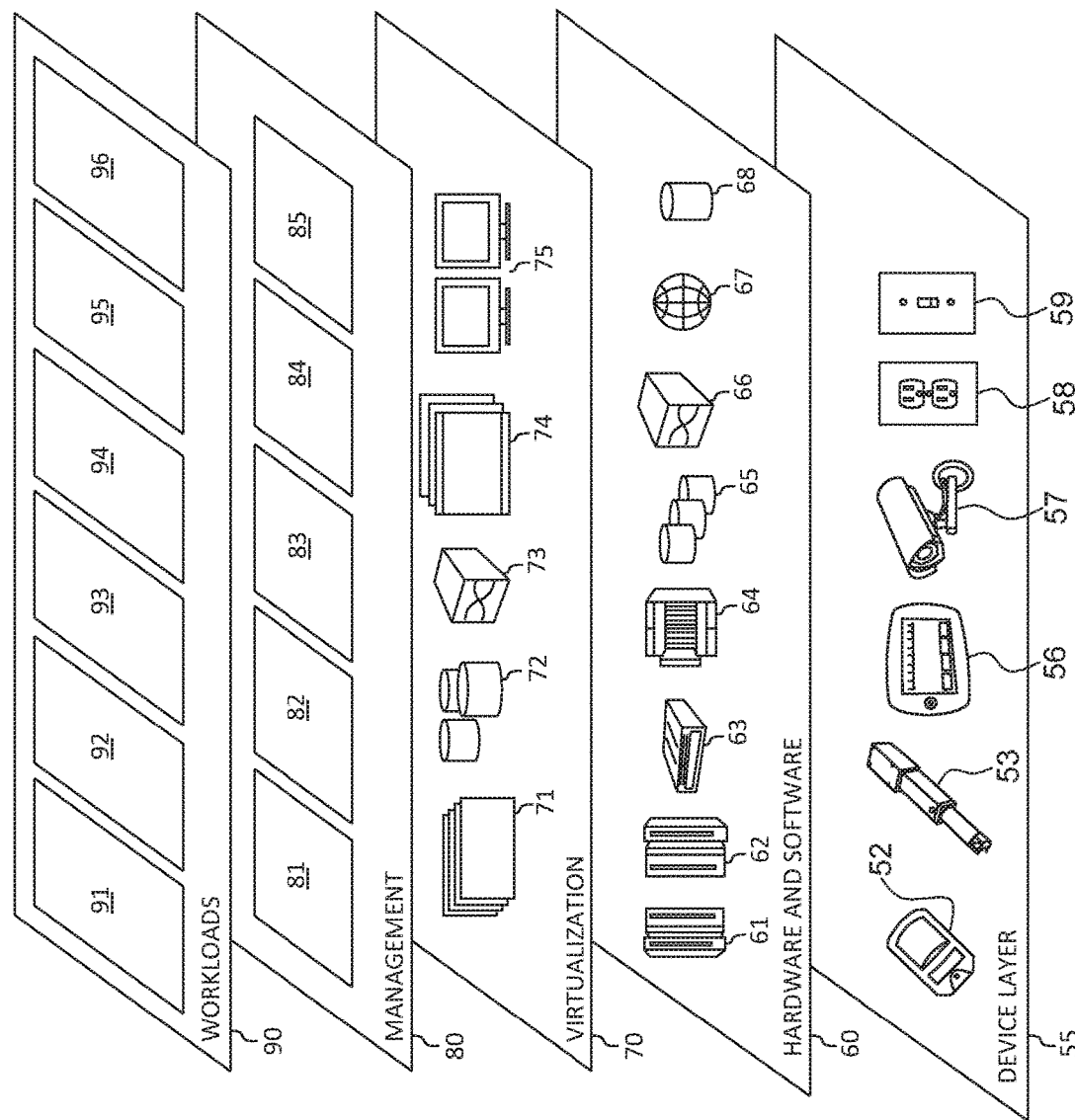
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote-control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for securing trained machine learning models against adversaries/adversarial systems in a cloud computing environment. In addition, workloads and functions 96 for securing trained machine learning models against adversaries/adversarial systems in a cloud computing environment may include such operations as analytics, deep-learning, and as will be further described, user and device management functions. One of ordinary skill in the art will appreciate that the workloads and functions 96 for securing trained machine learning models against adversaries/adversarial systems in a cloud computing environment may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously stated, the present invention provides novel solutions for providing hardened machine learning models that are secured against adversaries/adversarial systems in a computing system. One or more hardened machine learning models that are secured against adversarial challenges are provided by applying one or more of a plurality of combinations of selected preprocessing operations from one or more machine learning models, a data set used for hardening the one or more machine learning models, a list of preprocessors, and a selected number of learners.

Figure 4:
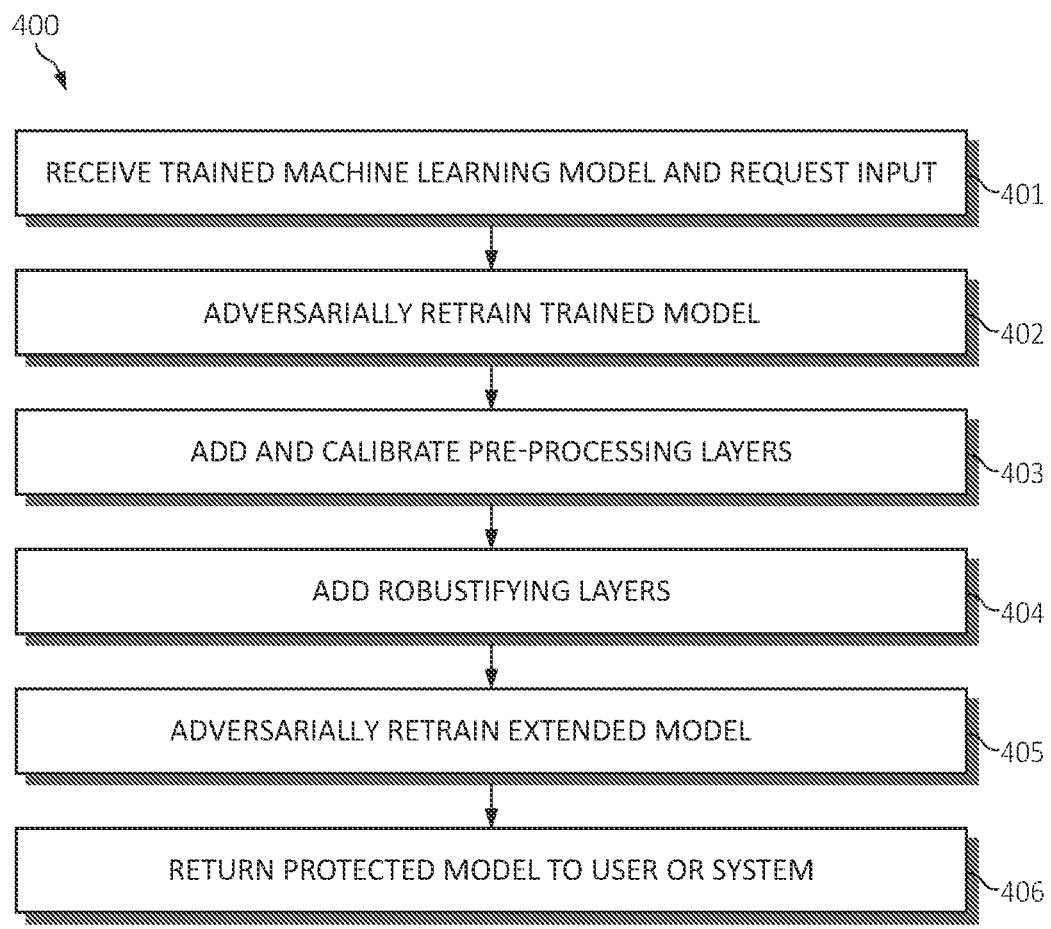
FIG. 4 is a flowchart diagram depicting an exemplary method for securing trained machine learning models against adversaries/adversarial systems in a computing environment by a processor in which aspects of the present invention may be realized.

Turning now to FIG. 4, a method 400 for securing trained machine learning models against adversaries/adversarial systems using a processor is depicted, in which various aspects of the illustrated embodiments may be implemented. The functionality 400 may be implemented as a method executed as instructions on a machine, where the instructions are included on at least one computer readable medium or one non-transitory machine-readable storage medium. It should be noted that one or more of the following operations/steps may be applied/selected or not applied/not selected (e.g., a user may select which of the steps are employed). The functionality 400 may start in block 402.

A trained machine learning model may be received and input data may be requested, as in block 401. That is, a user or computing system provides a trained machine learning model and/or the machine learning model may be received. Also, a request from the user may be received as to what kind of protections to apply or, in an alternative operation, the functionality 400 may automatically select one or more protections to apply.

One or more of the trained machine learning model may be adversarially retrained, as in block 402. That is, the functionality 400 may retrain the trained neural network using one or more adversarial protocols such as, for example, Madry's protocol, modified by additional adversarial measures such as, for example, by gradually increasing a ratio of adversarial samples in each mini-batch (e.g., according to a cosine schedule for the fraction, etc. or "fraction of data" where at each training iteration there may only be a fraction of data or a "mini-batch" of data to be used). This retraining step can change all or a just subset of the model weights. In one aspect, "adversarially retrain" means that a machine learning model may be retrained with adversarial examples and training data. The adversarial examples are not generated by a true adversary but by the owner of the machine learning model (e.g., the machine learning model is "vaccinated" against future adversarial attacks due to the adversarial retraining). Once the machine learning model is trained with the specified adversarial examples, then in the future if the machine learning model is attacked by those adversarial examples, the machine learning model will not make mistake or be caused to commit an error.

One or more pre-processing layers may be added and/or calibrated, as in block 403. In one aspect, adding the pre-processing operations to the trained machine learning models and calibrating trained machine learning models (e.g., adjusting a strength of JPEG compression, a variance of Gaussian noise, etc.) improves a trade-off of between benign and adversarial test accuracy.

One or more robustifying layers may be added, as in block 404. It one aspect, "robustifying layers" may indicate that one or more layers have been added to the trained machine learning models to cause and/or enable the trained machine learning models to be more robust and guarded against future adversarial attacks. In one aspect, the one or more neural network layers (e.g., convolutional, dense, etc.) may be added to extend and robustify the retrained machine learning model (e.g., retrained neural network). It should be noted that operations of block 404, for example, may be specific to neural network models.

The retrained machine learning model may be adversarial retrained (e.g., retrained with adversarial examples and training data), as in block 405. In one aspect, one or more of the machine learning model parameters of the extended machine learning model (e.g., following Madry's protocol) may be updated to create an adversarial protected machine learning model. In one aspect, the "extended machine learning model" means adding more layers to a current machine learning model such as, for example, from machine learning model M to M+K. Even if machine learning model M was already trained, the trained knowledge now will not function well with the added layers thus causing the need to retrain the new machine learning model "M+K".

The adversarial protected machine learning model may be returned to the user or system (e.g., deploy it into production, as in block 406, and optionally provide information about adversarial robustness performance information (e.g., test performance on benign and adversarial examples, for example under projected gradient decent ("PGD")(n,ε) white-box attack, fast gradient signed method ("FGSM")(ε) transfer attack and zeroth order optimization ("ZOO") based black-box attack, etc., minimum l∞-norm perturbation required to change classification, etc.)

Figure 5:
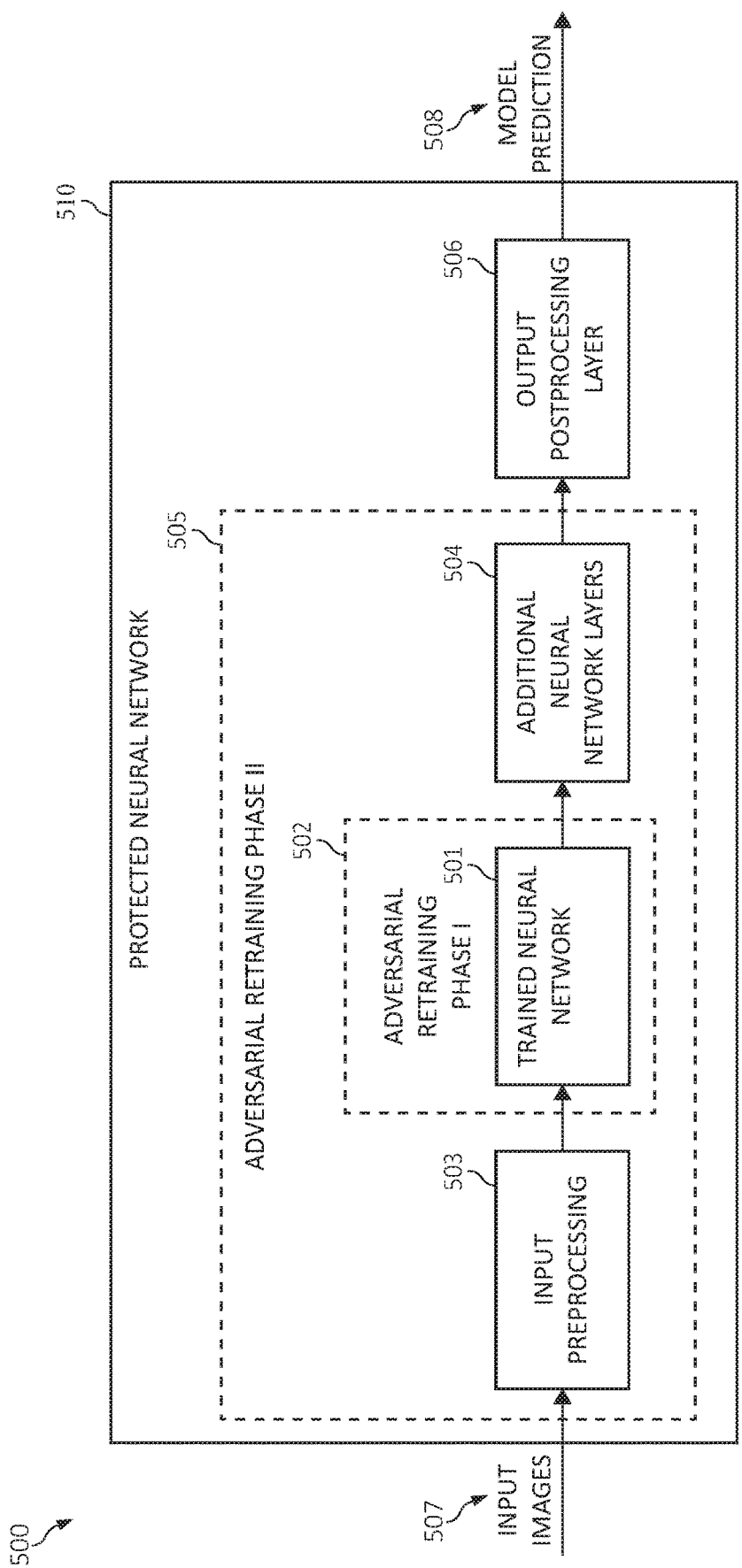
FIG. 5 is a block diagram depicting exemplary system and functionality for securing trained machine learning models against adversaries/adversarial systems in a computing environment by a processor in which aspects of the present invention may be realized; zin accordance with another embodiment of the present invention.

Turning now to FIG. 5, a block diagram of exemplary system 500 and functionality for securing trained machine learning models against adversaries/adversarial systems for images in a computing environment.

In one aspect, one or more of the components, modules, services, applications, and/or functions described in FIGS. 1-4 may be used in FIG. 5. As shown, various blocks of functionality are depicted with arrows designating the blocks' of system 500 relationships with each other and to show process flow. Additionally, descriptive information is also seen relating each of the functional blocks' of system 500. As will be seen, many of the functional blocks may also be considered "modules" of functionality, in the same descriptive sense as has been previously described in FIG. 4. With the foregoing in mind, the module blocks' of system 500 may also be incorporated into various hardware and software components of a system for image enhancement in accordance with the present invention. Many of the functional blocks 500 may execute as background processes on various components, either in distributed computing components, or on the user device, or elsewhere.

As depicted, system 500 includes a protected neural network 510 (e.g., hardened machine learning model system), which may be included in and/or external to the cloud computing node 10 and/or the computing system 12 of FIG. 1.

The protected neural network 510 may include performing an adversarial retraining operation in a first phase (e.g., "phase 1") and an adversarial retraining operation in a second phase (e.g., "phase 2").

The protected neural network 510 may receive as input data one or more images (e.g., "input images), as in block 507. The protected neural network 500 may add an input pre-processing layer to modify the input images (of block 507) such as, for example JPEG compression, Gaussian noise and a spatial smoothing, feature squeezing, etc., as in block 503.

A trained neural network (e.g., convolutional neural network "CNN", long short-term memory "LSTM," etc.) may be provided by a user or may be created by an automated system (e.g., via an automating neural network model), as in block 501. In a first phase, protected neural network 510 may adversarial retrain the trained neural network such as, for example, by following Madry's protocol with a projected gradient descent white-box attack with an infinity norm ("I∞ norm" or uniform norm) constraint on adversarial samples and using a gradual increase of adversarial samples according to a cosine schedule, as in block 502.

Also, one or more additional neural network layers may be added after the trained model (e.g., dense layer, convolutional layer, etc.), as in block 504. A second adversarial retraining operation (e.g., adversarial retraining phase 2) may be performed (similar to block 502) may be performed, as in block 505. The protected neural network 510 may add an output post-processing layer producing non-monotonic, non-differentiable transformation of output probabilities. The protected neural network 500 may provide a retrained machine learning model prediction (e.g., neural network prediction (e.g., classification, regression, etc.)), as in block 508.

Figure 6:
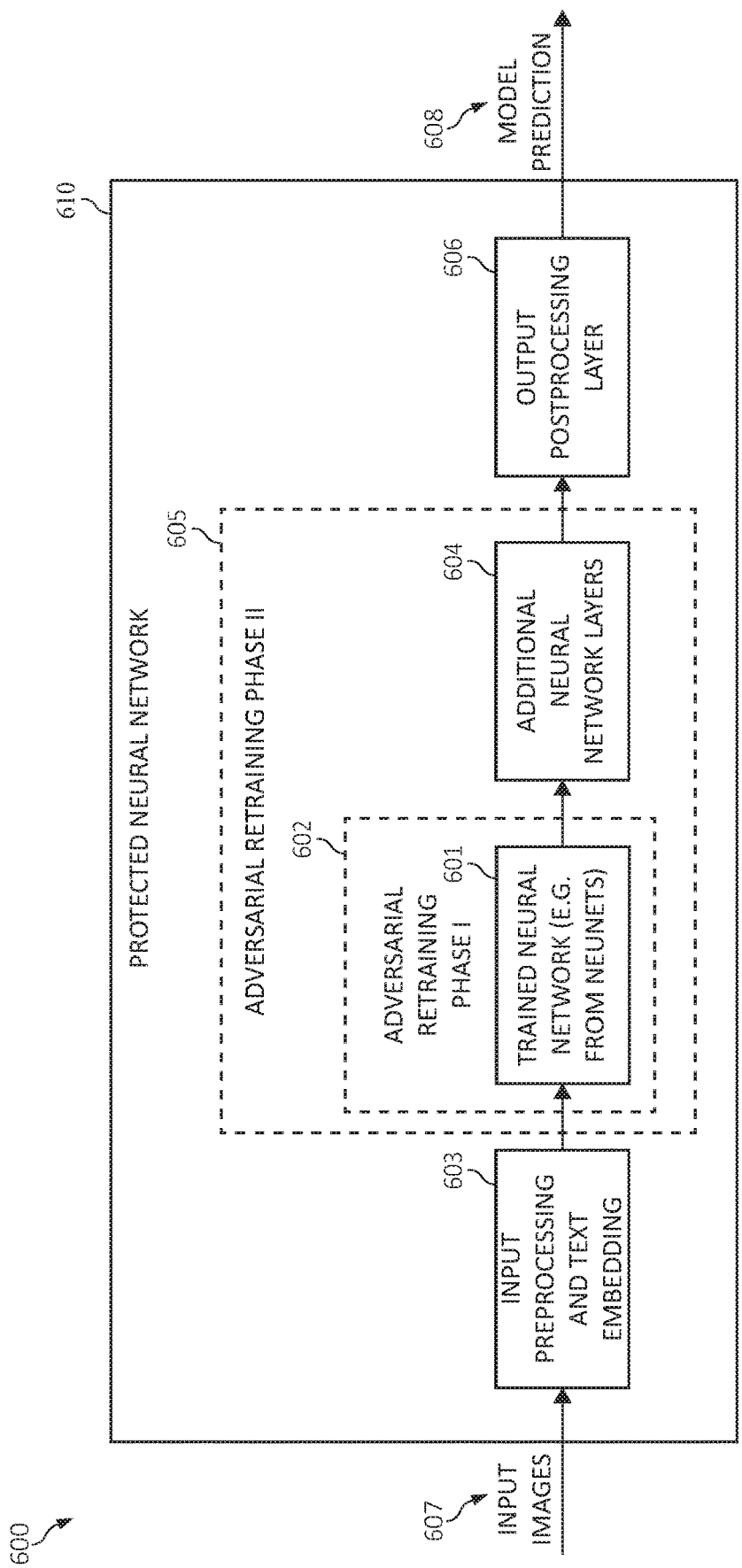
FIG. 6 is a block diagram depicting an additional exemplary system and functionality for securing trained machine learning models against adversaries/adversarial systems for images in a computing environment by a processor in which aspects of the present invention may be realized; zin accordance with another embodiment of the present invention.

Turning now to FIG. 6, block diagram depict and exemplary system for securing trained machine learning models against adversaries/adversarial systems for text data in a computing environment. In one aspect, one or more of the components, modules, services, applications, and/or functions described in FIGS. 1-5 may be used in FIG. 6. Repetitive description of like steps/blocks, elements, components, modules, services, applications, and/or functions employed in other embodiments described herein is omitted for sake of brevity.

As depicted, system 600 includes a protected neural network 610 (e.g., hardened machine learning model system), which may be included in and/or external to the cloud computing node 10 and/or the computing system 12 of FIG. 1.

The protected neural network 610 may include performing an adversarial retraining operation in a first phase (e.g., "phase 1") and an adversarial retraining operation in a second phase (e.g., "phase 2").

The protected neural network 610 may receive text data (e.g., "texts" such as, for example, short message service) input data (e.g., "input images), as in block 607. The protected neural network 610 may add an input pre-processing layers and text embedding, as in block 603. For example, in block 607, the protected neural network 610 may add a spell checking operations as potential input pre-processing defenses for adversarial robustness/protection such as, for example, to defeat attacks at a character level, lower casing, stemming, lemmatization, stop-word removal, normalization, noise removal, text enrichment/augmentation, etc. Also, text embedding may be added to transform the text data into numeric data such as, for example, by using pretrained word embeddings (e.g., global vectors "GloVe" for word representation and/or Word2Vec, etc.)

A trained neural network (e.g., convolutional neural network "CNN", long short-term memory "LSTM," etc.) may be provided by a user or may be created by an automated system, as in block 601.

In a first phase, protected neural network 610 may adversarial retrain the trained neural network, as in block 602. For example, the protected neural network 610 may adversarial retrain the trained neural network, by following Miyato's protocol by using fast gradient method adversarial training samples with $l_2$-norm ε and add an additional hidden layer before the output, possibly modified by additional measures like gradually increasing the ratio of adversarial samples in each mini-batch (e.g., according to a cosine schedule for the fraction, etc.).

Also, one or more additional neural network layers may be added after the trained model (e.g., dense layer, convolutional layer, etc.), as in block 604. A second adversarial retraining operation (e.g., adversarial retraining phase 2) may be performed (similar to block 602) may be performed, as in block 605. The protected neural network 610 may add an output post-processing layer producing non-monotonic, non-differentiable transformation of output probabilities. The protected neural network 610 may provide a retrained machine learning model prediction (e.g., neural network prediction (e.g., classification, regression, etc.)), as in block 608.

Figure 7:
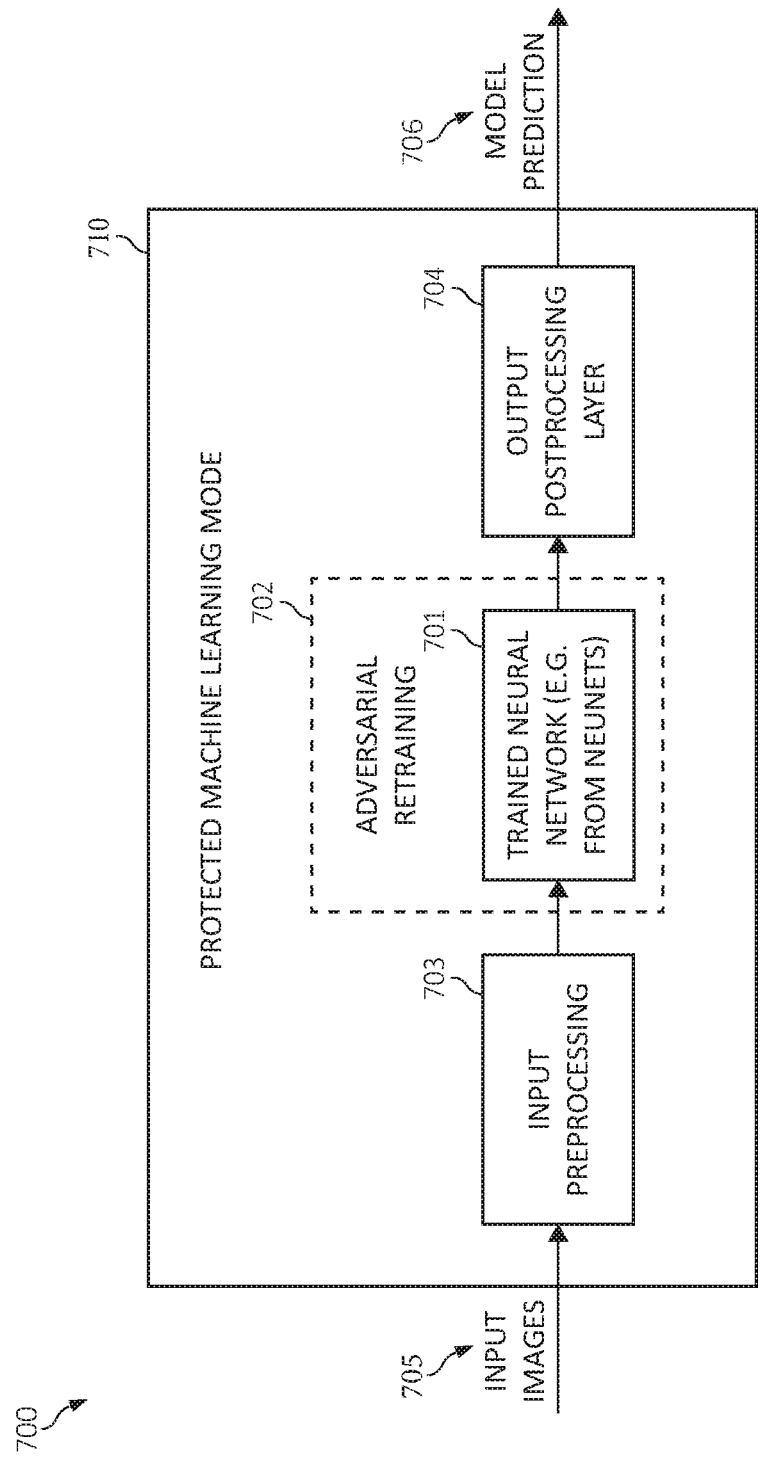
FIG. 7 is a block diagram depicting an additional exemplary operations for securing trained machine learning models against adversaries/adversarial systems in a computing environment by a processor in which aspects of the present invention may be realized; in accordance with another embodiment of the present invention.

Turning now to FIG. 7, block diagram depict and exemplary system for securing/protecting trained machine learning models against adversaries/adversarial systems for text data in a computing environment. In one aspect, one or more of the components, modules, services, applications, and/or functions described in FIGS. 1-6 may be used in FIG. 7. Repetitive description of like steps/blocks, elements, components, modules, services, applications, and/or functions employed in other embodiments described herein is omitted for sake of brevity.

As depicted, system 700 includes a protected neural network 710 (e.g., hardened machine learning model system), which may be included in and/or external to the cloud computing node 10 and/or the computing system 12 of FIG. 1.

The protected neural network 710 may receive input data, as in block 705. The protected neural network 710 may add an input pre-processing layers to modify the input data, as in block 703. For example, in block 707, the protected neural network 710 may modify the input data using compression, Gaussian noise, smoothing, and/or feature squeezing, etc.

A trained machine learning model (e.g., support vector machine "SVM", etc.) may be provided by a user or may be created by an automated system, as in block 701.

The protected neural network 710 may adversarially retrain (e.g., "adversarial retraining") the trained neural network, as in block 702. For example, the protected neural network 710 may adversarially retrain the trained neural network using fast gradient method adversarial training samples with $l_2$-norm $\varepsilon$ and add an additional hidden layer before the output, possibly modified by additional measures such as, for example, by gradually increasing the ratio of adversarial samples in each mini-batch (e.g., according to a cosine schedule for the fraction, etc.).

Also, one or more additional neural network layers may be added after the trained model, as in block 704. That is, the protected neural network 710 may add an output post-processing layer producing non-monotonic, non-differentiable transformation of output probabilities. The protected neural network 710 may provide a retrained machine learning model prediction (e.g., neural network prediction (e.g., classification, regression, etc.)), as in block 706.

Figure 8:
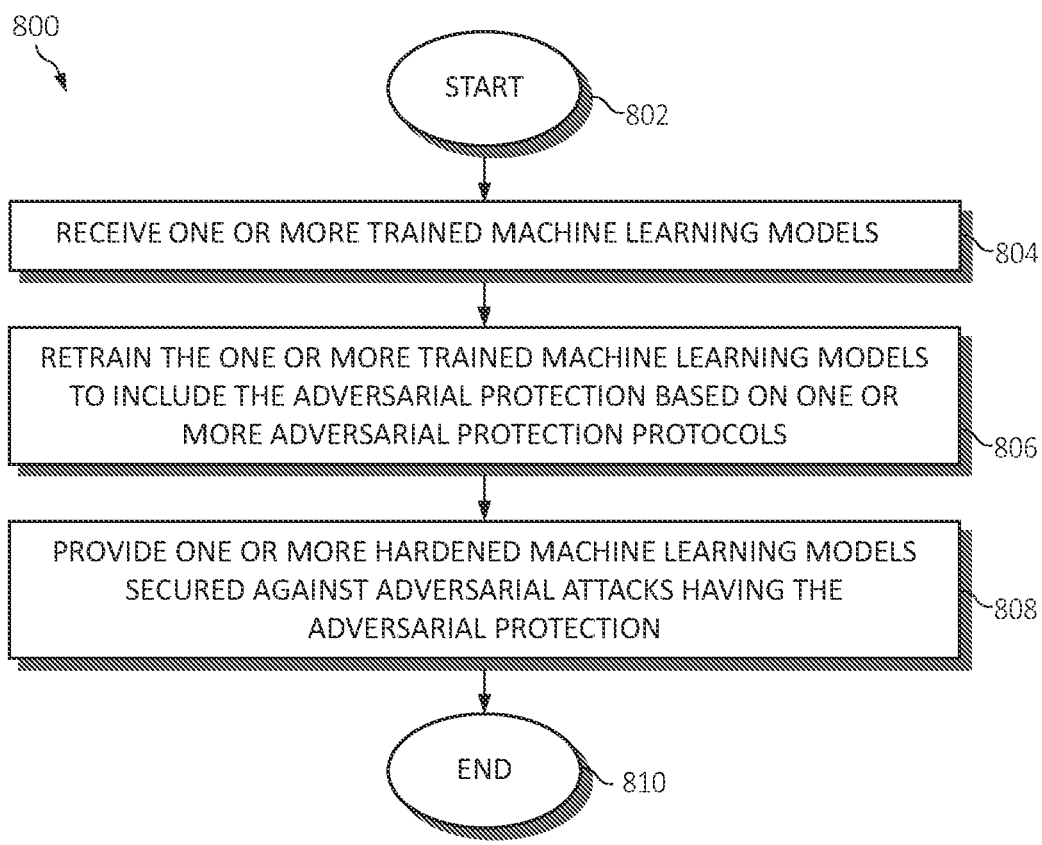
FIG. 8 is a flowchart diagram depicting an exemplary method for securing trained machine learning models against adversaries/adversarial systems in a computing environment by a processor, in which aspects of the present invention may be realized.

Turning now to FIG. 8, a method 800 for learning input preprocessing to harden machine learning models against adversarial using a processor is depicted, in which various aspects of the illustrated embodiments may be implemented. The functionality 800 may be implemented as a method executed as instructions on a machine, where the instructions are included on at least one computer readable medium or one non-transitory machine-readable storage medium. The functionality 800 may start in block 802.

One or more trained machine learning models may be received, as in block 804. The one or more trained machine learning models may be retained to include the adversarial protection based on one or more adversarial protection protocols, as in block 806. One or more hardened machine learning models secured against adversarial attacks are provided by adding adversarial protection to one or more trained machine learning model, as in block 808. The functionality 800 may end, as in block 810.

In one aspect, in conjunction with and/or as part of at least one blocks of FIG. 8, the operations of 800 may include each of the following. The operations of 800 may receive the one or more trained machine learning models and retrain the one or more trained machine learning models to include the adversarial protection based on one or more adversarial protection protocols.

The operations of 800 may add one or more preprocessing layers to one or more trained machine learning models, wherein a degree of adversarial protection strength is adjusted, add one or more neural network layers to one or more trained machine learning model, and/or add one or more post-processing output layers to the one or more trained machine learning models that are retrained with the adversarial protection based on one or more adversarial protection protocols.

The operations of 800 may automatically implement one or more adversarial protection protocols to be used for the providing one or more hardened machine learning models, and/or receive, from a user, one or more adversarial protection protocols to be used for the providing one or more hardened machine learning models.

The operations of 800 may monitor and track each state of the one or more trained machine learning models while being retrained, detect a training collapse to the one or more trained machine learning models during the retraining, and/or enable one or more roll-back strategies for the one or more trained machine learning models during the retraining. The operations of 800 may determine a security score for the one or more hardened machine learning models indicating a level of security from the adversarial attacks.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for securing trained machine learning models in a computing environment by one or more processors comprising:
   providing one or more hardened machine learning models secured against adversarial attacks by adding adversarial protection to one or more previously trained machine learning models, wherein the one or more hardened machine learning models are generated by iteratively retraining, following a specified protocol with a projected gradient descent white-box attack with an infinity norm constraint on adversarial samples, the one or more previously trained machine learning models using a ratio of the adversarial examples to benign examples selected from mini-batches of training data not previously input into the one or more trained machine learning models prior to a current retraining iteration, the ratio of adversarial examples iteratively increased during each retraining iteration according to a cosine schedule indicative of an amount of the adversarial examples and benign examples to select from the mini-batches of the training data to use for each subsequent retraining iterations;
   monitoring and tracking each state of the one or more previously trained machine learning models while being retrained;
   detecting a training collapse to the one or more previously trained machine learning models during the retraining; and
   enabling one or more roll-back strategies for the one or more previously trained machine learning models during the retraining.

2. The method of claim 1, further including:
   receiving the one or more previously trained machine learning models; and
   performing the retraining of the one or more previously trained machine learning models to include the adversarial protection based on one or more adversarial protection protocols.

3. The method of claim 1, further including adding one or more preprocessing layers to the one or more previously trained machine learning models, wherein a degree of adversarial protection strength is adjusted in each of the one or more preprocessing layers.

4. The method of claim 1, further including adding one or more neural network layers to the one or more previously trained machine learning models.

5. The method of claim 1, further including adding one or more post-processing output layers to the one or more previously trained machine learning models, the one or more post-processing output layers having been retrained with the adversarial protection based on one or more adversarial protection protocols.

6. The method of claim 1, further including:
automatically implementing one or more adversarial protection protocols to be used for providing the one or more hardened machine learning models; or
receiving, from a user, one or more adversarial protection protocols to be used for providing the one or more hardened machine learning models.

7. A system for securing trained machine learning models in a computing environment, comprising:
one or more computers with executable instructions that when executed cause the system to:
provide one or more hardened machine learning models secured against
adversarial attacks by adding adversarial protection to one or more previously trained machine learning models, wherein the one or more hardened machine learning models are generated by iteratively retraining, following a specified protocol with a projected gradient descent white-box attack with an infinity norm constraint on adversarial samples, the one or more previously trained machine learning models using a ratio of the adversarial examples to benign examples selected from mini-batches of training data not previously input into the one or more trained machine learning models prior to a current retraining iteration, the ratio of adversarial examples iteratively increased during each retraining iteration according to a cosine schedule indicative of an amount of the adversarial examples and benign examples to select from the mini-batches of the training data to use for each subsequent retraining iteration;
monitor and track each state of the one or more previously trained machine learning models while being retrained;
detect a training collapse to the one or more previously trained machine learning models during the retraining; and
enable one or more roll-back strategies for the one or more previously trained machine learning models during the retraining.

8. The system of claim 7, wherein the executable instructions:
receive the one or more previously trained machine learning models; and
performing the retraining of the one or more previously trained machine learning models to include the adversarial protection based on one or more adversarial protection protocols.

9. The system of claim 7, wherein the executable instructions add one or more preprocessing layers to the one or more previously trained machine learning models, wherein a degree of adversarial protection strength is adjusted in each of the one or more preprocessing layers.

10. The system of claim 7, wherein the executable instructions add one or more neural network layers to the one or more previously trained machine learning models.

11. The system of claim 7, wherein the executable instructions add one or more post-processing output layers to the one or more previously trained machine learning models, the one or more post-processing output layers having been retrained with the adversarial protection based on one or more adversarial protection protocols.

12. The system of claim 7, wherein the executable instructions:
automatically implement one or more adversarial protection protocols to be used for providing the one or more hardened machine learning models; or
receive, from a user, one or more adversarial protection protocols to be used for providing the one or more hardened machine learning models.

13. A computer program product for, by a processor, securing trained machine learning models in a computing environment, the computer program product comprising a non-transitory computer-readable storage medium having computer-readable program code portions stored therein, the computer-readable program code portions comprising:
an executable portion that provides one or more hardened machine learning models secured against adversarial attacks by adding adversarial protection to one or more previously trained machine learning models, wherein the one or more hardened machine learning models are generated by iteratively retraining, following a specified protocol with a projected gradient descent white-box attack with an infinity norm constraint on adversarial samples, the one or more previously trained machine learning models using a ratio of the adversarial examples to benign examples selected from mini-batches of training data not previously input into the one or more trained machine learning models prior to a current retraining iteration, the ratio of adversarial examples iteratively increased during each retraining iteration according to a cosine schedule indicative of an amount of the adversarial examples and benign examples to select from the mini-batches of the training data to use for each subsequent retraining iterations;
an executable portion that monitors and tracks each state of the one or more previously trained machine learning models while being retrained;
an executable portion that detects a training collapse to the one or more previously trained machine learning models during the retraining; and
an executable portion that enables one or more roll-back strategies for the one or more previously trained machine learning models during the retraining.

14. The computer program product of claim 13, further including an executable portion that:
receives the one or more previously trained machine learning models; and
performs the retraining of the one or more previously trained machine learning models to include the adversarial protection based on one or more adversarial protection protocols.

15. The computer program product of claim 13, further including an executable portion that adds one or more preprocessing layers to the one or more previously trained machine learning models, wherein a degree of adversarial protection strength is adjusted in each of the one or more preprocessing layers.

16. The computer program product of claim 13, further including an executable portion that:
adds one or more neural network la layers to the one or more previously trained machine learning models; or adds one or more post-processing output layers to the one or more previously trained machine learning models, the one or more post-processing output layers having been retrained with the adversarial protection based on one or more adversarial protection protocols.

17. The computer program product of claim 13, further including an executable portion that:
automatically implements one or more adversarial protection protocols to be used for providing the one or more hardened machine learning models; or
receives, from a user, one or more adversarial protection protocols to be used for providing the one or more hardened machine learning models.

\* \* \* \* \*